Patented Oct. 10, 1939

2,175,792

UNITED STATES PATENT OFFICE 2,175,792

VULCANIZATION OF RUBBER

Albert M. Clifford, Stow, Ohio, assignor to Wingfoot Corporation, Wilmington, Del., a corporation of Delaware No Drawing. Application November 7, 1935,
Serial No. 48,692

15 Claims. (Cl. 18—53)

This invention relates to a new class of chemical compounds suitable for use as accelerators of the vulcanization of rubber. It includes the compounds themselves, a method of preparing them, their use in rubber, and the rubber product derived thereby.

A number of compounds are known which are reaction products of mercaptazoles and imids. Representative are those disclosed in United States Reissue Patent 19,286. However, none of these disclosed compounds display the grouping of the compounds of the present invention.

These compounds are derived from mercaptazoles and diimids. They have the formula

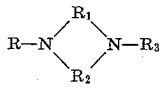

in which R and R₃ are mercaptazole residues and R₁ and R₂ are aryl nuclei or are combined to form one aryl nucleus.

Representative of these compounds is bis thio benzothiazyl p-quinone diimine. This material may be prepared as follows: A mixture of 26.3 grams of p-benzoquinone dichloro imid and 63 grams of sodium benzothiazyl mercaptide in 350 cc. of dry benzene was refluxed on a water bath for about two and a quarter hours. The reaction mixture was cooled, filtered, and dried. The soluble sodium salts formed were removed by triturating in water. The residual solid was filtered off, washed, and dried. The product, weighing 60.2 grams, was a dark red-maroon solid, which melted at 208–210° C. after recrystallization from xylene. Analysis showed it to contain 11.97% nitrogen and 29.3% sulphur, compared with the calculated values for bis thio benzothiazyl p-quinone diimine of 12.83% and 29.40%, respectively.

It has been found that best results are obtained when the reaction is conducted under substantially anhydrous conditions. The reactant materials are dried if necessary and a dry nonreactive medium such as toluene, xylene, or other aromatic hydrocarbons is preferably used.

The reaction may be represented by the following equation:

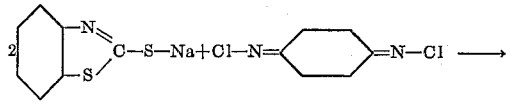

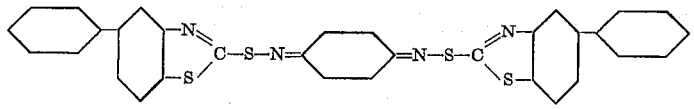

Other thiazoles may be substituted for the mercaptobenzothiazole of the example. These others include 1-mercapto thiazole, 1-mercapto 4-phenyl thiazole, the 1-mercaptonaphthothiazoles, 1-mercapto 3-methyl benzothiazole, 1-mercapto 5-ethoxy benzothiazole, 1-mercapto 5-nitro benzothiazole, 1-mercapto 5-hydroxy benzothiazole, 1-mercapto 5-chloro benzothiazole, 1-mercapto 5-phenyl amino benzothiazole, the 1-mercapto xylyl thiazoles, 1-mercapto 5-nitro 4-chloro benzothiazole and other 1-mercapto ring substituted arylene thiazoles. Also, the invention is not limited to their sodium salts. Other reactive salts, as potassium, calcium, etc. may also be used.

Also, the p-benzoquinone dichloro imid may be replaced by the ortho- compound or the analogous naphthoquinone and anthraquinone compounds. Also, compounds of the phenazine type may be employed. Also, the other halogens, such as bromine may be substituted for chlorine.

The structural formulae of some representative compounds of the invention obtained by employing the foregoing reactants follow:

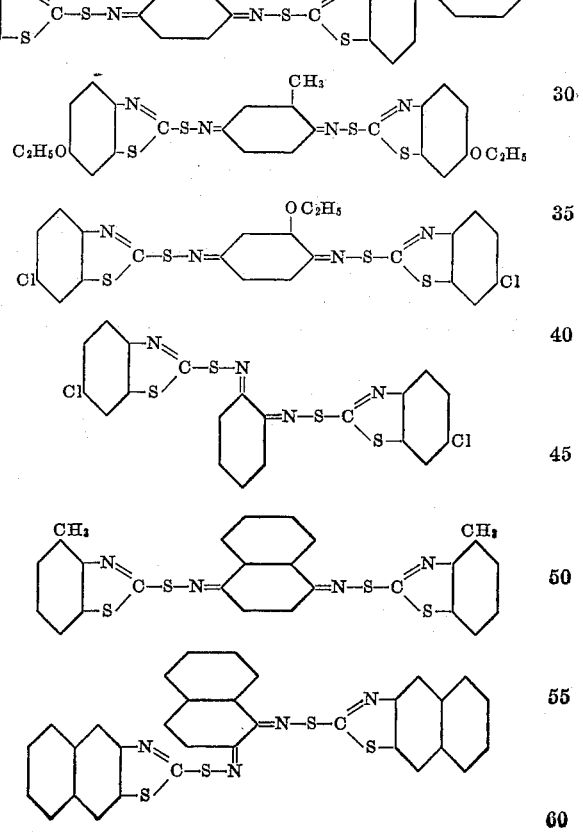

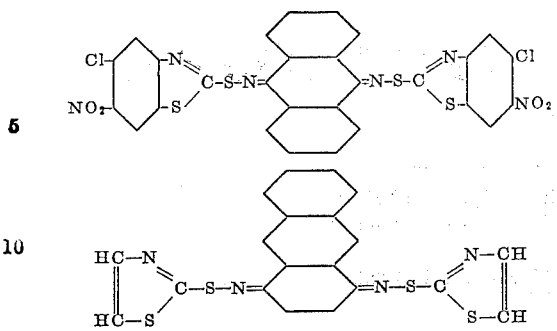

It will, of course, be understood that the foregoing compounds are merely representative and are in no way to be construed as limitative of the invention. It is intended that the compounds include broadly the derivatives of any mercaptazole and any di imido aryl substance as typified by the quinone and phenazine type compounds.

The compounds of the invention may be employed as accelerators in most of the ordinary rubber mixes. The following is one specific formula in which they have been found by trial to yield excellent results:

|  | Parts by weight |
|---|---|
| Extracted rubber | 100 |
| Zinc oxide | 5 |
| Sulphur | 3 |
| Stearic acid | 1.5 |
| Accelerator | 0.5 |

Samples were mixed in accordance with this formula, cured, and tested. The results obtained when bis thio benzothiazyl p-quinone diimine was employed as the accelerator were as follows:

| Cure in minutes at ° F. | Tensile kgs./cm.$^2$ | Ultimate elongation | Modulus in kgs./cm.$^2$ | |
|---|---|---|---|---|
|  |  |  | 500% | 700% |
|  |  | *Percent* |  |  |
| 20/260 |  | No cure |  |  |
| 40 | 68 | 950 | 7 | 16 |
| 60 | 127 | 830 | 18 | 60 |
| 80 | 155 | 770 | 26 | 102 |

Examination of the data readily shows the very desirable curing characteristics obtained, particularly the absence of cure in the early stages. This will permit use of the compounds in mixes subjected to very severe processing conditions previous to vulcanization.

The compounds may also be used in conjunction with basic nitrogen-containing accelerators such as the diaryl guanidines, the aldehyde-amine accelerators, butyl ammonium oleate, diphenyl guanidine phthalate, dibenzyl amine, etc.

While only the preferred forms of the invention have been described in detail, it will be apparent to those skilled in the art that many variations may be made therein without departing from the spirit of the invention or the scope of the appended claims in which it is intended to claim all features of patentable novelty residing in the invention.

What I claim is:

1. The method of treating rubber which comprises vulcanizing it in the presence of an N, N' bis (1-thio thiazyl) quinone di imine.
2. The method of treating rubber which comprises vulcanizing it in the presence of an N, N' bis (1-thio thiazyl) benzoquinone di imine.
3. The method of treating rubber which comprises vulcanizing it in the presence of an N, N' bis (1-thio thiazyl) naphthoquinone di imine.
4. The method of treating rubber which comprises vulcanizing it in the presence of an N, N' bis (1-thio benzothiazyl) benzoquinone di imine.
5. As new compounds, the N, N' bis (1-thio thiazyl) quinone di imines.
6. As new compounds, the N, N' bis (1-thio benzothiazyl) benzoquinone di imines.
7. A rubber product which has been vulcanized in the presence of an N, N' bis (1-thio thiazyl) quinone di imine.
8. As new compounds, the N, N' bis (1-thio thiazyl) benzoquinone di imines.
9. As new compounds, the N, N' bis (1-thio thiazyl) naphthoquinone di imines.
10. As a new compound, N, N' bis (1-thio benzothiazyl) p-quinone di imine.
11. The method of treating rubber which comprises vulcanizing it in the presence of N, N' bis (1-thio benzothiazyl) p-quinone di imine.
12. A rubber product which has been vulcanized in the presence of an N, N' bis (1-thio thiazyl) benzoquinone di imine.
13. A rubber product which has been vulcanized in the presence of N, N' bis (1-thio thiazyl) naphthoquinone di imine.
14. A rubber product which has been vulcanized in the presence of N, N' bis (1-thio thiazyl) benzoquinone di imine.
15. A rubber product which has been vulcanized in the presence of N, N' bis (1-thio thiazyl) p-quinone di imine.

ALBERT M. CLIFFORD